Figure 1:
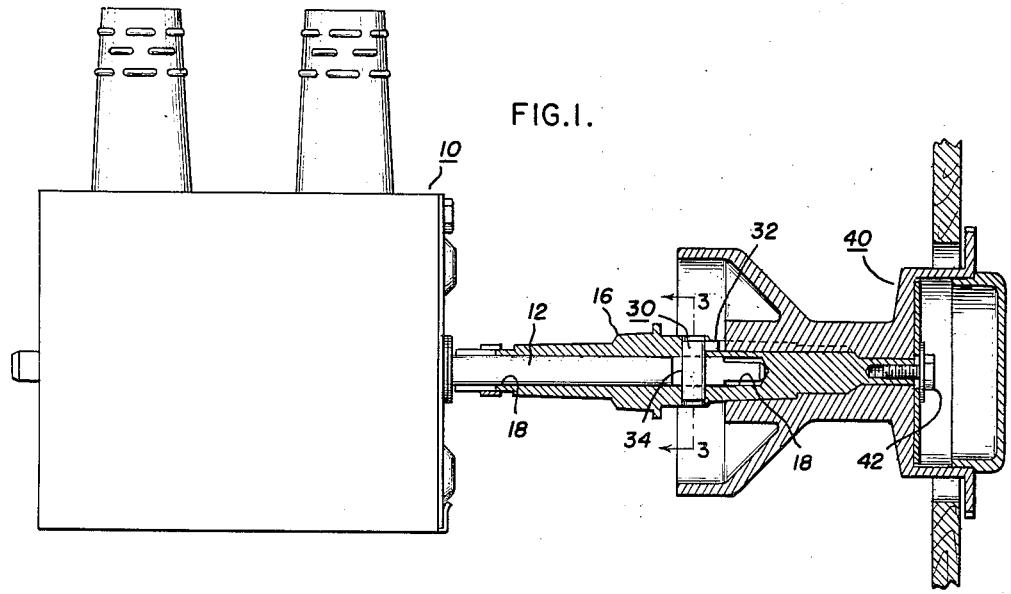

June 21, 1960     J. M. PARSONS     2,941,827

SHAFT STRUCTURE

Filed March 17, 1958

INVENTOR:
JOHN M. PARSONS,
BY Joseph Levinson
HIS ATTORNEY.

United States Patent Office 2,941,827
Patented June 21, 1960

2,941,827
SHAFT STRUCTURE

John M. Parsons, Syracuse, N.Y., assignor to General Electric Company, a corporation of New York Filed Mar. 17, 1958, Ser. No. 721,821

1 Claim. (Cl. 287—126)

This invention relates to a shaft structure and more particularly to a shaft structure for interconnecting an inner shaft with an outer shaft to prevent backlash or movement between the shafts when either is rotated.

One method commonly employed in interconnecting a pair of co-operating shafts is to provide a set screw on one of the shafts which bears on the other shaft inserted therein to hold the shafts together. The set screw method of interconnecting two co-operating shafts has several disadvantages. One disadvantage resides in the set screw forcing the inner shaft to one side of the outer shaft producing a wobbling action at the end of the shaft. The set screw is subject to loosening through vibration or other movement of the shaft. Then too, if the set screw is not tightened properly or loosens, a certain amount of play or backlash results. Other disadvantages of the set screw method of attaching two shafts resides in the expense involved and in the more difficult assemblage and adjustment.

Accordingly, it is an object of this invention to provide a novel shaft structure for interconnecting an inner shaft and an outer shaft which presents a positive connection between the two shafts and prevents relative movement between the interconnected shafts when rotated.

It is a further object of this invention to provide a novel shaft structure which is more economical and easier to assemble than prior devices used to perform the same function.

In carrying out this invention in one illustrative embodiment thereof, an outer shaft is provided having a chamber therein adapted to receive an inner shaft. A hole or opening is provided in the outer shaft which extends into the chamber. A resilient pin is inserted in the opening and extends into the chamber engaging the inner shaft and the wall of the chamber when the inner shaft is inserted into the chamber thereby filling a cross-sectional area of the chamber to hold the shafts together and prevent relative movement between them when either is rotated.

These and other advantages of this invention will be more clearly understood from the following description taken in connection with the accompanying drawings, and its scope will be apparent from the appended claim.

Figure 2:
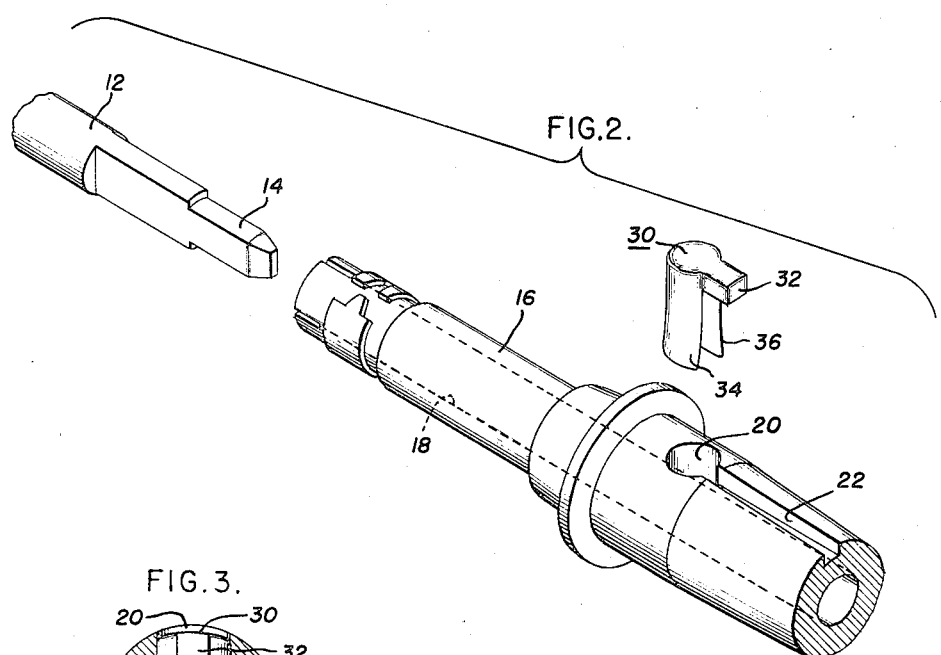
Figure 3:
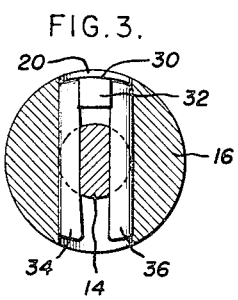

In the drawings:

Fig. 1 is a side view, partly in section, of the shaft structure of this invention utilized in a television tuner for channel selection purposes, Fig. 2 is an exploded view of the shaft structure shown in Fig. 1, and Fig. 3 is a cross-sectional view taken along lines 3—3 of Fig. 1.

Referring now to Fig. 1, the shaft structure embodied in this invention is shown comprising an inner shaft 12 interconnected with an outer shaft 16 by a resilient pin 30. This shaft structure is shown utilized in a television tuner 10. A control knob device 40 is connected by a screw 42 to the outer shaft 16 for rotating the shaft.

The inner shaft 12 is connected to the television tuner 10 and is utilized in a manner well known in the art for selecting different television channels. The control knob mechanism and the specific application of the shaft structure of this invention to a television tuner for channel selection purposes is merely illustrative of one application of the present shaft structure, and the invention is not considered limited to this particular application.

Referring now to Figs. 2 and 3 for a more detailed description of the shaft structure, the shaft 12 has a tongue 14 on one end portion thereof. The outer shaft 16 has a chamber 18 therein adapted to receive the tongue 14 and a portion of the inner shaft 12. The outer shaft 16 is also provided with an opening or a hole 20 which extends into or through the chamber 18. A keyway 22 is provided on the opening or hole 20 in outer shaft 16. As will be obvious to those skilled in the art, other means may be utilized to position the resilient pin 30 in the hole 20. For example, the resilient pin 30 may have a square head fitting into a square portion above the hole. The resilient pin 30 having a key 32 thereon and legs 34 and 36 is adapted to fit into the opening 20 with the key 32 registering with keyway 22 and the legs 34 and 36 extending into the chamber 18 of the outer shaft 16.

The resilient pin 30 is shaped somewhat like a clothespin and is preferably made of a suitable plastic material which is resilient and resists wear. A nylon plastic has been found suitable for this application.

In assembling the device, the resilient pin 30 is inserted into the hole 20 of outer shaft 16. When the pin 30 is so inserted the legs 34 and 36 are pinched together, and the pin is further positioned by the key 32 which registers with keyway 22 in the outer shaft 16. The inner shaft 12 is then inserted into the chamber 18 of outer shaft 16. The tongue 14 of inner shaft 12 forces the legs 34 and 36 of resilient pin 30 outward to bear on the walls of the chamber 18, thus filling the void or all of the space in the chamber on either side of tongue 14. This is best shown in Fig. 3. Consequently, it is readily seen that as either shaft is turned, no chance for backlash or relative movement between the two shafts results when the shafts are rotated.

The resilient pin 30 thus performs the dual function of keying the inner shaft to the outer shaft and preventing backlash or relative movement between the shafts. When the shaft structure is assembled, vibration or other movement does not affect the positive connection between the two shafts provided by the resilient pin 30. The shaft structure is easy to assemble and less expensive than such prior art methods, e.g. the set screw, as previously explained.

Fig. 1 shows one application of the use of the shaft structure embodied in this invention. As the outer shaft 16 is rotated by the control knob mechanism 40, this motion is transmitted to the inner shaft which selects the proper electrical circuits to provide the television channel desired in a manner well known in the art. This is but one of many applications in which the shaft structure of this invention may be employed.

Since other modifications varied to fit particular operating requirements and environments will be apparent to those skilled in the art, this invention is not considered limited to the examples chosen for purposes of disclosure, and covers all changes and modifications which do not constitute departures from the true spirit and scope of this invention.

What I claim as new and desire to secure by Letters Patent of the United States is:

A shaft structure for interconnecting two shafts to prevent relative rotational movement between said shafts comprising an inner shaft having a tongue at one end thereof, said tongue having opposite sides that are flat and tapered in the direction of the end of said tongue, an outer shaft having an annular wall defining a chamber therein, an opening extending through said wall, a keyway in the outer surface of said outer shaft communicating with said opening, a pin comprised of a head portion, two spaced parallel legs of resilient material extending therefrom, and a key on one side of said head portion extending in a direction perpendicular to said legs, the inner surfaces of said legs lying in parallel planes, said pin being inserted in said opening so that said legs extend into said chamber with their inner surfaces being parallel to the axis of said chamber and said key fits into said keyway, said legs being of such size as to leave a space between the legs and the sides of said chamber when they are not distended, said inner shaft being inserted into said chamber with said tongue thereof extending between said legs of said pin and forcing said legs against the walls defining said chamber so as to fill up the space between said legs and the side of said chamber.

References Cited in the file of this patent

UNITED STATES PATENTS

| | | |
|---|---|---|
| 456,341 | Reid | July 21, 1891 |
| 823,833 | Webb | June 19, 1906 |
| 1,375,606 | Peyer | Apr. 19, 1921 |
| 1,658,264 | Sutton et al. | Feb. 7, 1928 |